United States Patent [19]
Kawasaki et al.

[11] Patent Number: 5,748,292
[45] Date of Patent: May 5, 1998

[54] COUPLING MECHANISM FOR USE IN A SEMI-OPENABLE DOCUMENT PRESSER OF AN IMAGE FORMING APPARATUS

[75] Inventors: Kotaro Kawasaki; Kazumi Noda, both of Osaka, Japan

[73] Assignee: Mita Industrial Co., Ltd., Osaka-fu, Japan

[21] Appl. No.: 686,991

[22] Filed: Jul. 25, 1996

[30] Foreign Application Priority Data

Aug. 17, 1995 [JP] Japan .................... 7-209719

[51] Int. Cl.$^6$ .................... G03B 27/62
[52] U.S. Cl. .................... 355/75
[58] Field of Search .................... 355/75, 76; 399/379, 399/380

[56] References Cited

U.S. PATENT DOCUMENTS

| | | | |
|---|---|---|---|
| 4,093,377 | 6/1978 | Tsuda | 355/76 |
| 4,466,736 | 8/1984 | Masaki | 355/75 |
| 4,636,065 | 1/1987 | Kanemitsu et al. | 355/75 |
| 5,060,019 | 10/1991 | Fukunaga | 355/75 X |

FOREIGN PATENT DOCUMENTS

| | | |
|---|---|---|
| 6-148761 | 5/1994 | Japan . |
| 7-219073 | 8/1995 | Japan . |

*Primary Examiner*—Fred L. Braun
*Attorney, Agent, or Firm*—Jordan and Hamburg

[57] ABSTRACT

A semi-openable document presser for an image forming apparatus includes a main member and an auxiliary member in which the main member is pivotably mounted on the image forming apparatus. A biasing pivotal coupler is disposed between the main and auxiliary members, the coupler providing a biasing force which biasingly disposes the main and auxiliary members in a non-actuated position in which the main and auxiliary members are in a generally planar relationship. The document presser is operable to the actuated by an operator to overcome the biasing force to dispose the main and auxiliary members in an actuated position which disposes the main and auxiliary members in a non-planar relationship.

13 Claims, 4 Drawing Sheets

COUPLING MECHANISM FOR USE IN A SEMI-OPENABLE DOCUMENT PRESSER OF AN IMAGE FORMING APPARATUS

BACKGROUND OF THE INVENTION

The present invention relates to a document presser for use in an image forming apparatus such as a copying machine, and more particularly to a coupling mechanism for a semi-openable document presser having a construction that a substantially front half portion of the document presser is made openable and closable independently of a rear half portion thereof.

Conventionally, a document presser for assuredly pressing a document on a contact glass during an image formation is provided in an image forming apparatus such as a copying machine to prevent a document displacement during the image formation, thereby copying an image of the document properly. Generally, there have been used document pressers of a single flat member. The document presser is mounted on a main body of an image forming apparatus and made openable and closable. However, recently, there has been increased a demand for a so-called "semi-openable" document presser to facilitate correction of a positional displacement of a small sized document. This semi-openable document presser comprises a front half portion and a rear half portion and can be brought to a half opened or half closed state where the substantially front half portion of the document presser is opened, in other words, only the rear half portion is closed as well as to a completely opened and closed state where the document presser including the first half portion and the rear half portion is completely opened and closed.

FIG. 3 shows a conventional document presser 10. The document presser 10 comprises a main presser member 12a for covering a rear half portion of a contact glass C provided in a copying machine P, and an auxiliary presser member 12b for covering a front half portion of the contact glass C, namely, a substantially half portion on the side of an operation panel of the copying machine P (the left half portion in FIG. 3). The main presser member 12a and auxiliary presser member 12b are coupled to each other with a hinge member 13 to be rotatable with each other, i.e., these two portions 12a and 12b are bendable with respect to each other. A damper member 14 is adhered over an entire underside surface of the main presser member 12a and the auxiliary presser member 12b.

The main presser member 12a is provided at a rear end thereof with a pivotal mechanism 15 for opening and closing the document presser 10 entirely. The document presser 10 is mounted to a rear end of the copying machine P through the pivotal mechanism 15. The main presser member 12a is rotated about a pivot 16 of the pivotal mechanism 15, thereby making the document presser 10 openable and closable with respect to the contact glass of the copying machine P.

In a completely opened state (the state shown by dashed and single dotted line in FIG. 3), the document presser 10 is brought to an upright opened posture in which the main pressing portion 12a is made upright by a biasing force of a spring 17 provided in the pivotal mechanism 15. On the other hand, in a completely closed state (the state shown by solid line in FIG. 3), the document presser 10 is kept in its closed state by the weight thereof. After the document presser 10 being brought to the completely closed state, by opening only the auxiliary presser member 12b (the state shown by dashed and double dotted line in FIG. 3), that is, bringing the document presser 10 to a semi-opened state, it can be confirmed whether the document is placed on the contact glass C in a proper position. Also, the position of the document can be corrected easily if the document is not placed in the proper position.

The above conventional document presser 10 has suffered the following problems due to the construction that the main presser member 12a and the auxiliary presser member 12b are coupled to each other via the hinge member 13.

Specifically, when being brought to the completely opened state, the document presser 10 is bent at the hinge member as shown in the state (A) of FIG. 4. Namely, the auxiliary presser member 12b is inclined rearward of the copying machine P or rotated in a clockwise direction by a specified angle with respect to the main presser member 12a by its weight. This makes it difficult for an operator standing in front of the copying machine P to reach the document presser, and for the operator to close the document presser. Moreover, the document presser in this state impairs the aesthetic appearance of the copying machine P.

When the document presser 10 is being closed, the auxiliary presser member 12b inclines in a counterclockwise direction with respect to the main presser member 12a which receives the biasing force of the spring 17 of the pivotal mechanism 15 until the document presser 10 is closed by a particular position. Specifically, the document presser 10 is in the state (B) of FIG. 4 in which the auxiliary presser member 12b inclines in the counterclockwise direction with respect to the main presser member 12a. This causes an adverse or unfavorable forces to the closing operation of the document presser 10.

When the document presser 10 is being further closed from the state (B) of FIG. 4, the main presser member 12a naturally falls by the weight against the biasing force of the spring 17 of the pivotal mechanism 15 at a certain degree of inclination. At this time, even if an operator holds the auxiliary presser member 12b with his or her hand, the main presser member 12a abruptly falls or inclines as the state (C) of FIG. 4. This abrupt fall of the main presser member 12a causes an air disturbance which is likely to blow away or displace a document placed on the contact glass C, consequently resulting in erroneous copy.

SUMMARY OF THE INVENTION

It is an object of the present invention to provide a coupling mechanism of a semi-openable document presser for use in an image forming apparatus which has overcome the problems residing in the prior art.

It is another object of the present invention to provide a coupling mechanism of a semi-openable document presser which is simpler in construction and assures an improved operability.

The present invention is directed to a coupling mechanism for use in a semi-openable document presser of an image forming apparatus, the document presser including a main presser member for covering a rear half portion of an upper surface of the apparatus and an auxiliary presser member for covering a front half portion of the upper surface of the apparatus, the main presser member being pivotally attached at a rear end of the apparatus, the coupling mechanism comprising: a coupler provided between the main and auxiliary presser members for coupling the main and auxiliary presser members with each other in such a manner as to allow the auxiliary presser member to rotate in an opening direction when receiving a predetermined external force exerted by an operator and give the main and auxiliary presser members a restoring force of straightening with respect to each other when not receiving the predetermined external force.

With this arrangement, the coupler allows the auxiliary presser member to rotate in an opening direction when a predetermined external force is exerted to the auxiliary presser member by an operator. However, when the predetermined external force is not exerted to the auxiliary presser member, the coupler gives the main and auxiliary presser members a restoring force of straightening with respect to each other. This will prevent the auxiliary presser member from inclining rearward with respect to the main presser member in a completely opened state. Also, the entire document presser can be closed and opened without bending at the connection portion. The auxiliary presser member can be easily opened to correct the position of a document placed on the upper surface of the apparatus while keeping the main presser member in the closed state.

Also, the coupler may be provided with a strength resistible against a maximum moment of the pivotal main presser member at a forward end of the main presser member. As mentioned above, generally, a semi-openable document presser is mounted on an image forming apparatus via a pivotal mechanism. The pivotal mechanism is operable to exert to a main presser member a force of biasing the main presser member in an opening direction. However, this kind of semi-openable document presser is likely to suffer the problem that the main presser member abruptly falls by the weight when the moment of the main presser member becomes larger than the biasing force of the pivotal mechanism while the document presser is in the way of closing. The provision of the inventive coupling mechanism, which includes the coupler having the strength resistible against a maximum moment of the pivotal main presser member at a forward end of the main presser member, on such semi-openable document presser will assuredly prevent the main presser from abruptly falling.

Further, the coupler may be constructed by a hinge member for connecting the main and the auxiliary presser members to be rotatable relative to each other and a spring bridgingly attached to the main and auxiliary presser members. This will assure a simpler construction and smaller size for the coupling mechanism.

The above and other objects, features and advantages of the present invention will become more apparent upon a reading of the following detailed description and drawings.

DETAILED DESCRIPTION OF THE PREFERRED EMBODIMENT OF THE INVENTION

An embodiment of the present invention will be described with reference to the accompanying drawings.

Figure 1:
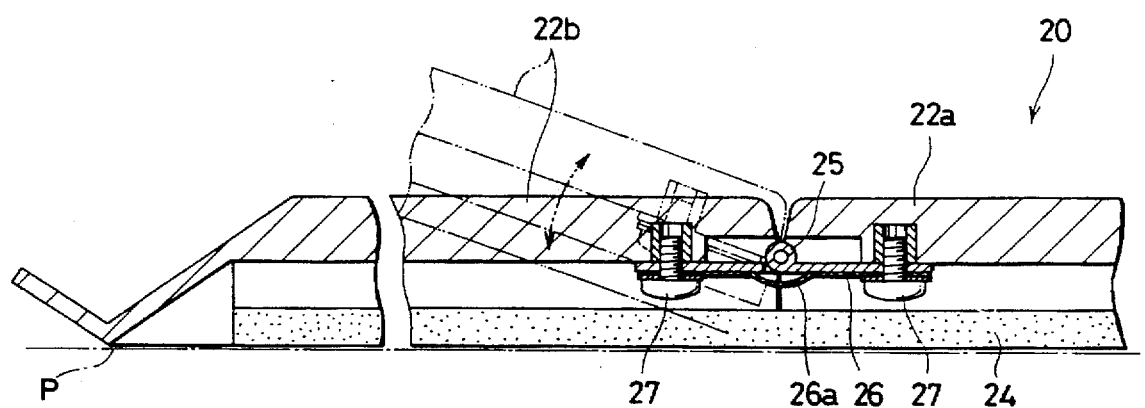
FIG. 1 is a cross sectional view showing a coupling mechanism incorporated in a semi-openable document presser according to the present invention.
Figure 3:
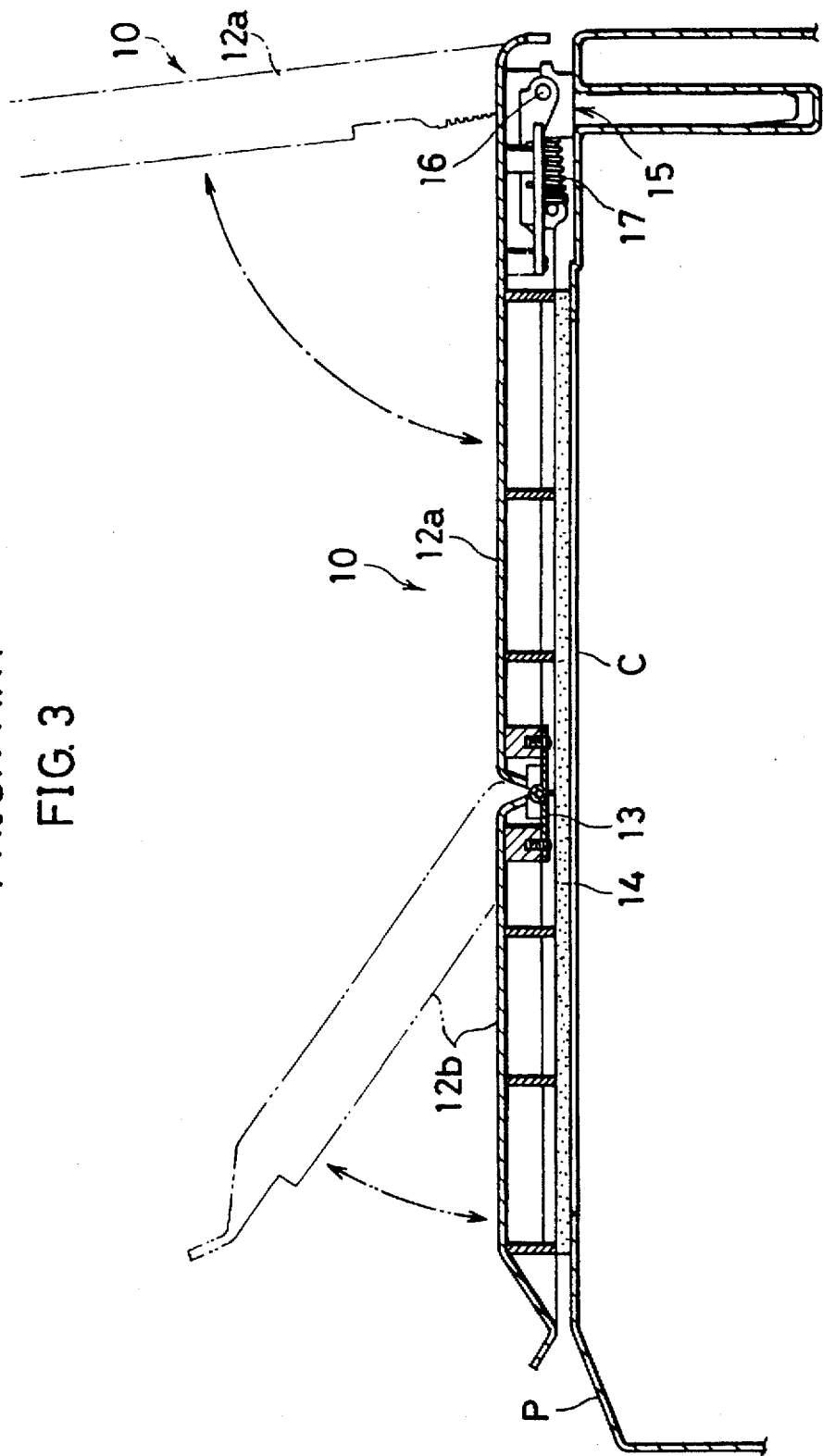
FIG. 3 is a cross sectional view showing a conventional semi-openable document presser.

FIG. 1 is a cross sectional view showing an inventive coupling mechanism incorporated in a semi-openable document presser. A document presser 20 has an arrangement similar to the conventional document presser 10 shown in FIG. 3. Specifically, the document presser 20 comprises a main presser member 22a for covering a rear half portion of a contact glass (not shown) mounted in a copying machine P and an auxiliary presser member 22b for covering a front half portion of the contact glass. The main presser member 22a and the auxiliary presser member 22b are coupled to each other to be rotatable or inclinable with respect to each other. An unillustrated pivotal mechanism for opening and closing the document presser 20 is provided at a rear end of the main presser member 22a. The pivotal mechanism is internally provided with a spring for biasing the document presser 20 in a clockwise direction of opening the document presser 20. The document presser 20 is attached on the copying machine P via the pivotal mechanism.

A damper member 24 is adhered on an entire underside surface of the main presser member 22a and the auxiliary presser member 22b to securely hold a document on the contact glass.

The main presser member 22a and the auxiliary presser member 22b are connected to each other via a hinge member 25. The auxiliary presser member 22b is rotatable with respect to the main presser member 22a. However, the auxiliary presser member 22b is kept from rotating further in a counterclockwise direction from the state where the main presser member 22a and the auxiliary presser member 22b are on the same horizontal plane (the state shown by solid lines in FIG. 1), i.e., the state where the document presser 20 is in the form of a flat plate.

Specifically, a plate spring 26 is bridgingly attached to the main presser member 22a and the auxiliary presser member 22b. The plate spring 26 is generally flat but a bulge portion 26a formed at an intermediate portion thereof. The plate spring 26 is disposed below the hinge member 25. The bulge portion 26a of the plate spring 26 is positioned just below a pivot of the hinge member 25. The plate spring 26 is fixedly attached to the main and auxiliary presser members 22a and 22b together with the hinge member 25 by means of screws 27 and 27. The hinge member 25 and the plate spring 26 constitute a coupler of the coupling mechanism of the present invention.

In this arrangement, when the auxiliary presser member 22b is rotated in the clockwise direction by a specified angle to change the document presser 20 from the state where the main presser member 22a and the auxiliary presser member 22b are on the same horizontal plane (the state shown by solid lines in FIG. 1) to the state shown by dashed and double dotted lines in FIG. 1, the auxiliary presser member 22b receives from the plate spring 26 a force of rotating the auxiliary presser member 22b in the counterclockwise direction about the pivot of the hinge member 25, i.e., a force of restoring the auxiliary presser member 22b to the state shown by solid lines in FIG. 1.

When being brought in a completely opened state, the document presser 20 is kept in the opened state by the biasing force of the spring provided in the pivotal mechanism. On the other hand, when being brought in a completely closed state (the state shown by solid lines in FIG. 1), the document presser 20 is kept in the closed state by the weight thereof.

In the closed state, the position of a document placed on the contact glass can be corrected by rotating or raising the auxiliary presser member 22b with respect to the main presser member 22a to thereby open a front half portion of the document presser 20.

Figure 2:
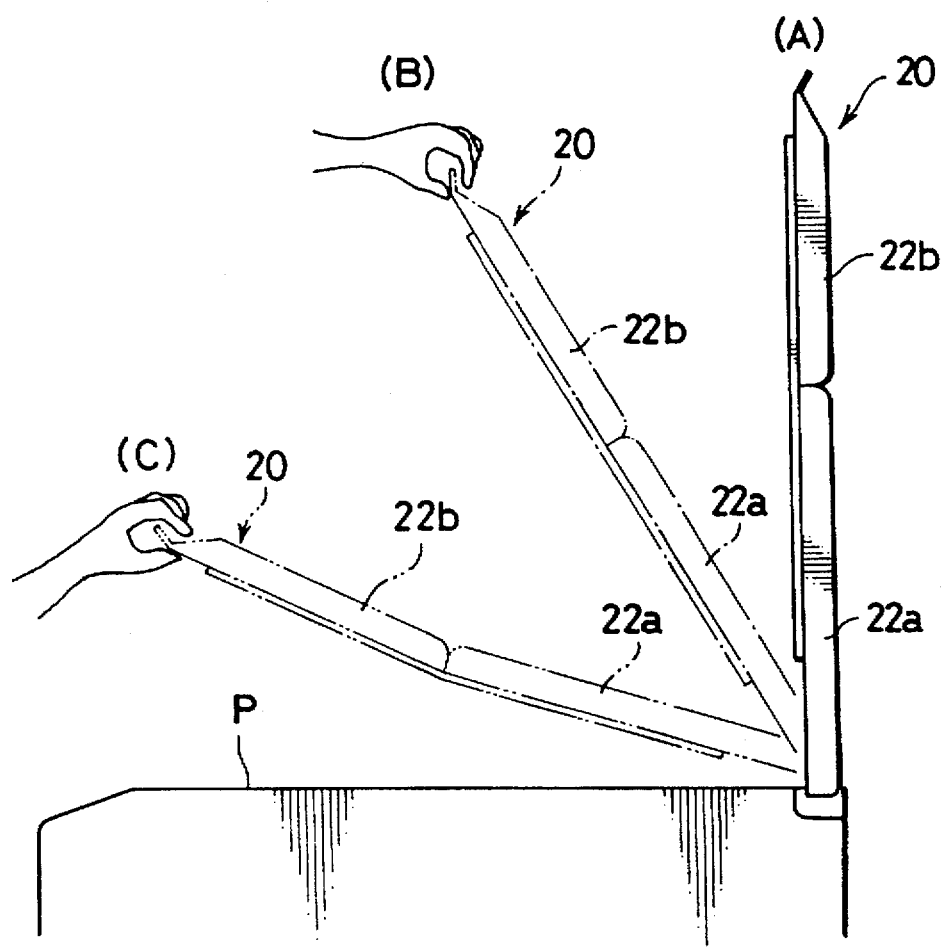
FIG. 2 is a side view of the semi-openable document presser incorporated with the inventive coupling mechanism, showing an opening or closing of the document presser.

When the document presser 20 is in the completely opened state, i.e., the state (A) of FIG. 2, the resilient force of the plate spring 26 is exerted to the auxiliary presser member 22b and the auxiliary presser member 22b is thus prevented from inclining rearward of the copying machine P by the weight. Consequently, the main presser member 22a and the auxiliary presser member 22b can be kept in the same plane. This will eliminate the drawbacks of the conventional document presser that the auxiliary presser member of the document presser bends rearward at the hinge portion in the completely opened state and an operator standing in front of the copying machine is difficult to reach the document presser and close the document presser, and the copying machine has poor aesthetic appearance.

Figure 4:
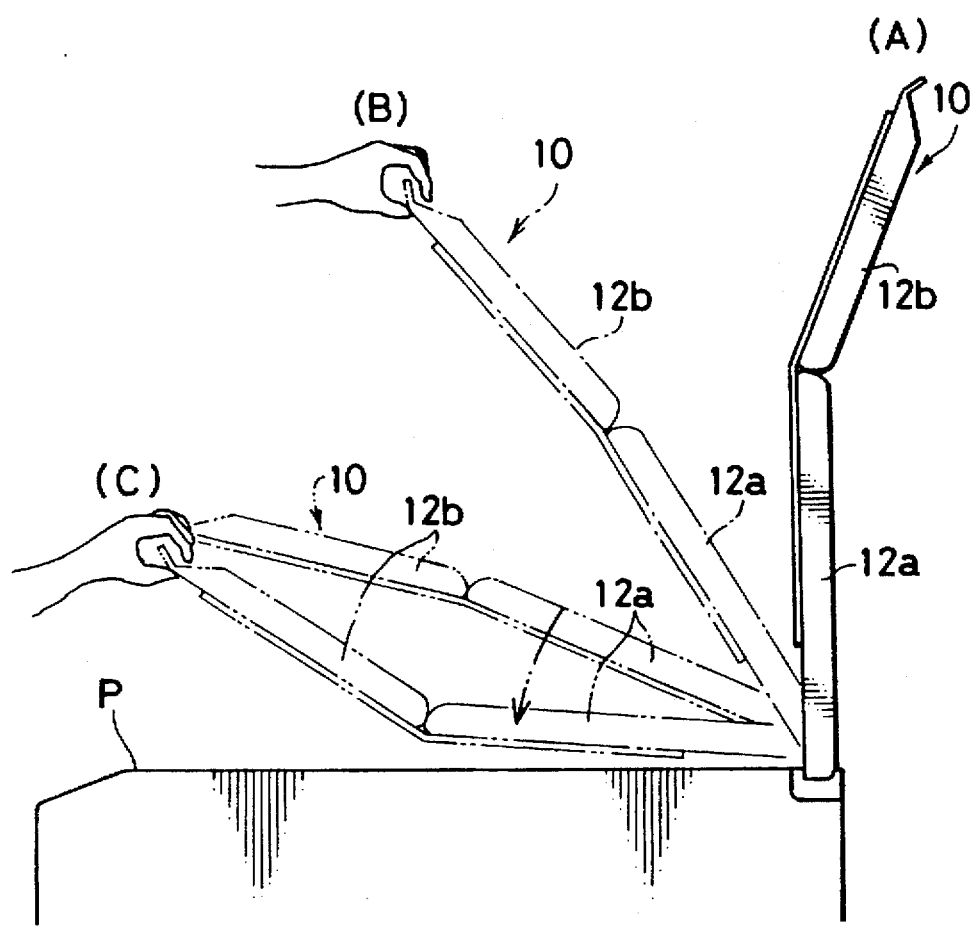
FIG. 4 is a side view of the conventional document presser, showing an opening or closing of the document presser.

When being closed, also, the document presser 20 can be kept in the straight form as the state (B) of FIG. 2 by the resilient force of the plate spring 26 without the likelihood that the document presser bends at the hinge portion as the state (B) of FIG. 4.

When the document presser is further being closed, the falling moment of the main presser member 22a becomes larger than the biasing force of the spring provided in the pivotal mechanism at a certain degree of inclination. However, the main presser member 22a is prevented from falling abruptly because the plate spring 26 gives a force of supporting up the main presser member 22a. This will eliminate the drawbacks of the conventional document presser that the main presser member abruptly falls and consequently causes air turbulence likely to blow away or displace a document placed on the contact glass.

As mentioned above, the document presser 20 can have an improved operability for the document presser and assure the aesthetic appearance as a copying machine.

The coupling mechanism is very simple in construction in that the spring plate 26 is arranged on the hinge member 25 between the main presser member 22a and the auxiliary presser member 22b. Also, the document presser 20 can be produced in a reduced size.

Moreover, the inventive coupling mechanism makes it possible to easily improve the operability of semi-openable document pressers of already-marketed copying machines by merely removing a damper member from the underside of the document presser and mounting a plate spring over a hinge member.

The document presser 20 is an exemplary document presser incorporated with a coupling mechanism according to the present invention. The inventive coupling mechanism may be used for other document pressers having a different construction without departing from the spirit and scope of the present invention. In the foregoing embodiment, the plate spring 26 is formed into a generally flat shape having the bulge portion 26a. However, it may be possible to use a plate spring having a thickness and size suitable for exerting a resilient force enough to attain the above-mentioned operations and effects. The thickness and size of a plate spring may be changed in accordance with the size and weight of a document presser. However, it may be preferable to provide such a curved portion as the bulge portion 26a in the plate spring to allow the auxiliary presser member 22b to be easily opened by an operator's hand.

In the foregoing embodiment, the plate spring 26 is bridgingly attached to the presser members 22a and 22b together with the hinge member 25. However, the hinge member 25 and the plate spring 26 may be independently attached to the main and auxiliary presser members 22a and 22b.

Further, in place of the plate spring 26, the pivot of the hinge member 25 may be extended by a specified distance in the axial direction thereof, and an extended portion of the pivot may be mounted with a helical coil spring to give the auxiliary presser member 22b a restoring force of straightening with respect to the main presser member 22a. This arrangement, similar to the document presser 20 provided with the plate spring 26, can effectively prevent the drawbacks that the auxiliary presser member 22b inclines rearward in the completely opened state and the main presser member 22a comes into abrupt contact with the contact glass during the closing operation. In this case, however, it may be preferable to add a regulating member for regulating the auxiliary presser member 22b from rotating in the counterclockwise direction to compensate for the one side biasing of the coil spring toward the direction of closing the auxiliary presser member 22b.

The present invention is applicable to image forming apparatus other than copying machines in which a document presser is connected to the copying machine via a pivotal mechanism. Specifically, the present invention is applicable to a copying machine having a reciprocally movable document placement portion in which a document presser is openably and closably connected to the document placement portion by a hinge member.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A coupling mechanism for use in a semi-openable document presser of an image forming apparatus, the document presser including a main presser member for covering a rear half portion of an upper surface of the apparatus and an auxiliary presser member for covering a front half portion of the upper surface of the apparatus, the main presser member being attached to the apparatus pivotally at a rear end of the main presser member, the coupling mechanism comprising:

a coupler provided between the main and auxiliary presser members for coupling the main and auxiliary presser members with each other in such a manner as to allow the auxiliary presser member to rotate in an opening direction relative to the main presser member when receiving a predetermined external force exerted by an operator and to provide the main and auxiliary presser members with a restoring force for straightening the auxiliary and main presser members with respect to each other when not receiving the predetermined external force.

2. A coupling mechanism according to claim 1, wherein the coupler has a strength resistible against a maximum moment of the pivotal main presser member at a forward end of the main presser member.

3. A coupling mechanism for use in a semi-openable document presser of an image forming apparatus, the document presser including a main presser member for covering a rear half portion of an upper surface of the apparatus and an auxiliary presser member for covering a front half portion of the upper surface of the apparatus, the main presser member being attached to the apparatus pivotally at a rear end of the main presser member, the coupling mechanism comprising:

a coupler provided between the main and auxiliary presser members for coupling the main and auxiliary presser members with each other in such a manner as to allow the auxiliary presser member to rotate in an opening direction when receiving a predetermined external force exerted by an operator and give the main and auxiliary presser members a restoring force of straightening with respect to each other when not receiving the predetermined external force, said coupler comprising a hinge member for connecting the main and the auxiliary presser members to be rotatable relative to each other, and a spring bridgingly attached to the main and auxiliary presser members.

4. A coupling mechanism for use in a semi-openable document presser of an image forming apparatus, the document presser including a main presser member for covering a rear half portion of an upper surface of the apparatus and an auxiliary presser member for covering a front half portion of the upper surface of the apparatus, the main presser member being attached to the apparatus pivotally at a rear end of the main presser member, the coupling mechanism comprising:

a coupler provided between the main and auxiliary presser members for coupling the main and auxiliary presser members with each other in such a manner as to allow the auxiliary presser member to rotate in an opening direction relative to the main presser member when receiving a predetermined external force exerted by an operator the coupler including a spring bridgingly attached to the main and auxiliary presser members for providing the main and auxiliary presser members with a restoring force for straightening the auxiliary and main presser member with respect to each other when not receiving the predetermined external force.

5. A semi-openable document presser for an image forming apparatus including a main member and an auxiliary member in which the main member is pivotably mounted on the image forming apparatus, a biasing pivotal coupler between said main and auxiliary members, said coupler providing a biasing force which biasingly disposes said main and auxiliary members in a non-actuated position in which said main and auxiliary members are in a generally planar relationship, said document presser being operable when actuated by an operator to overcome said biasing force and dispose said main and auxiliary members in an actuated position which disposes said main and auxiliary members in a non-planar relationship.

6. A semi-openable document presser according to claim 5 wherein said coupler is operable to biasingly return said main and auxiliary members from said actuated position to said non-actuated position.

7. A semi-openable document presser according to claim 5 wherein said coupler biasingly returns said main and auxiliary members to said non-actuated position when the operator ceases to actuate the document presser to overcome said biasing force.

8. A semi-openable document presser for an image forming apparatus comprising a main member and an auxiliary member, pivot means pivotably mounting said main member on the image forming apparatus, a biasing pivotal coupler between said main and auxiliary members, said coupler providing a biasing force which biasingly disposes said main and auxiliary members in a non-actuated position in which said main and auxiliary members are disposed in a generally planar relationship, said document presser being operable to be selectively actuated by an operator to overcome said biasing force and dispose said main and auxiliary members in an actuated position in which said main and auxiliary members are in a non-planar relationship, said document presser being operable to be selectively actuated by an operator to biasingly returning said main and auxiliary members to said non-actuated position.

9. A semi-openable document presser according to claim 8 wherein said coupler comprises a biasing element attached to said main and auxiliary members.

10. A semi-openable document presser according to claim 8 wherein said coupler comprises a biasing element, a first connector connecting said biasing element to said main member and a second connector connecting said biasing element to said auxiliary member.

11. A semi-openable document presser according to claim 8 wherein said coupler comprises a hinge and a plate spring.

12. A semi-openable document presser according to claim 11 wherein said plate spring has a bulge generally underlying said hinge.

13. A semi-openable document presser according to claim 11 further comprises a first connector for connecting one portion of said hinge and one portion of said plate spring to said main member and a second connector for connecting another portion of said hinge and another portion of said plate spring to said auxiliary member.

* * * * *